3,100,680
Patented Aug. 13, 1963

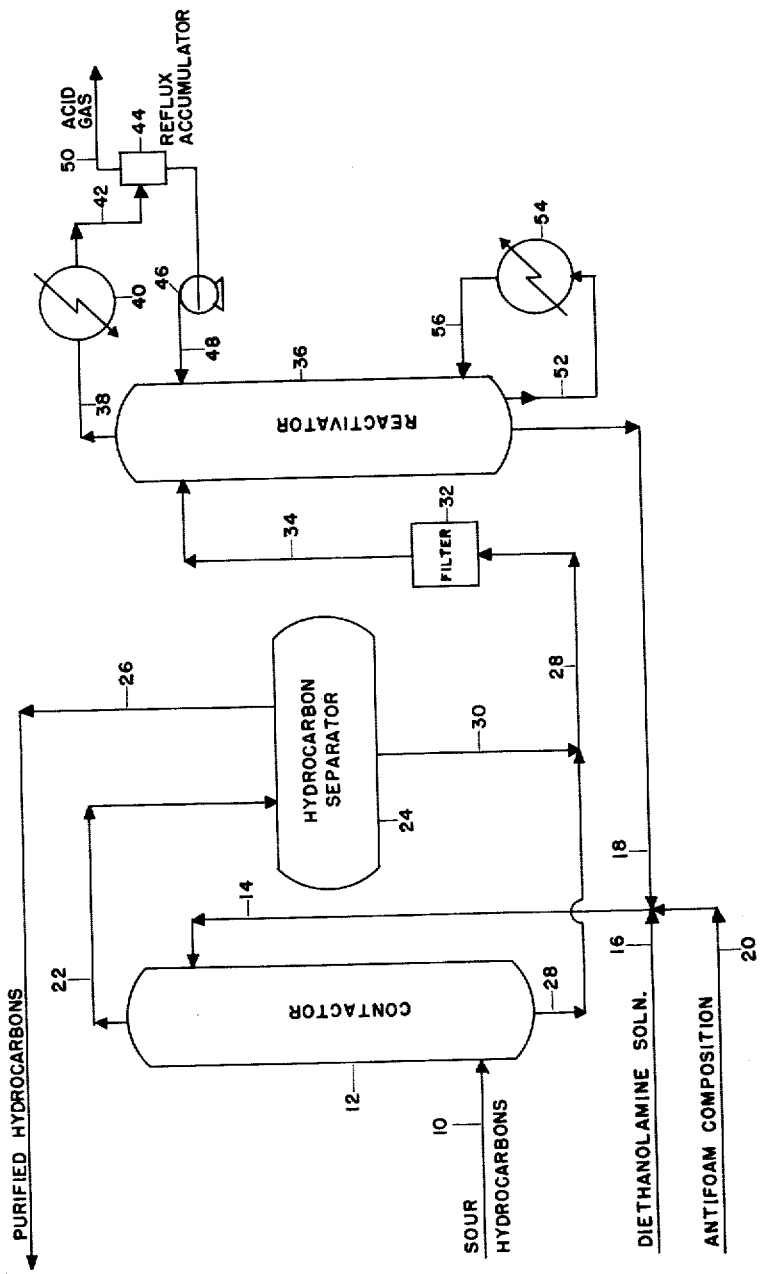

3,100,680
**METHOD OF INHIBITING FOAMING OF DIETH-
ANOLAMINE SOLUTIONS IN TREATING GASES**
John R. Shaw and Henry L. Vornkahl, Port Arthur, Tex.,
assignors to Gulf Oil Corporation, Pittsburgh, Pa., a
corporation of Pennsylvania
Filed Dec. 27, 1960, Ser. No. 78,729
8 Claims. (Cl. 23—3)

This invention relates to a new and improved antifoam composition and to a method of preventing foaming in a process for separating acidic gases, such as hydrogen sulfide and carbon dioxide, from gaseous and liquid hydrocarbon mixtures.

The presence of hydrogen sulfide and carbon dioxide in gaseous and liquid hydrocarbons makes further use of such hydrocarbons undesirable in most instances. Once separated, however, the hydrogen sulfide can be converted into sulfur or otherwise utilized, the carbon dioxide can be purified for further use, and the hydrocarbons can be recovered for use as such or converted into useful products. Many processes have been developed for separating hydrogen sulfide and carbon dioxide from gaseous and liquid hydrocarbon mixtures. One of the more desirable commercial processes for separating acidic gases from gaseous and liquid hydrocarbon mixtures thereof comprises scrubbing the so-called "sour" hydrocarbon mixture in a spray, packed or bubble plate column with an aqueous diethanolamine solution flowing countercurrently to the hydrocarbon stream. The aqueous diethanolamine solution absorbs the acidic gases and a "sweet" hydrocarbon stream is obtained. The absorbed acidic gases are thereafter separated from the diethanolamine solution by heating, which regenerates the diethanolamine solution for further use.

The efficiency of a process for separating acidic gases from a hydrocarbon mixture by absorption with an aqueous diethanolamine solution is, among other things, dependent upon the efficiency of the contactor in which the absorption takes place. Thus, to obtain optimum separation of the acidic gases from the hydrocarbon mixture, the contactor should provide for intimate contact of the hydrocarbon mixture with the diethanolamine solution. Various contactors of the spray, packed and bubble plate type have been designed to give optimum contact between countercurrently flowing streams. The efficiency of such contractors, however, is greatly reduced if foaming of one or both of the flowing streams occurs. In the past, some foaming has been encountered in countercurrently contacting a mixture of acidic gases and hydrocarbons with an aqueous diethanolamine solution. Foaming in the contactor is undesirable because it reduces the extractive effect of the diethanolamine solution for lack of intimate contacting.

We have discovered that the foaming normally tending to occur in countercurrently contacting a mixture of acidic gases and hydrocarbons with an aqueous diethanolamine solution can be prevented by incorporating in the diethanolamine solution a small amount of an antifoam composition comprising a mixture of a light mineral oil and cottonseed oil. Thus, our invention is based upon an improvement in a process for separating acidic gases, such as hydrogen sulfide and carbon dioxide, from a mixture of acidic gases and hydrocarbons by contacting said mixture with an aqueous diethanolamine solution upon contacting conditions normally tending to induce foaming, said improvement comprising contacting said mixture of acidic gases and hydrocarbons with an aqueous diethanolamine solution containing a small amount, sufficient to inhibit the normal foaming tendency, of an antifoam composition comprising a mixture of a light mineral oil and cottonseed oil. Our invention is further based upon a novel antifoam composition, particularly adapted for use in a process for separating acidic gases, such as hydrogen sulfide and carbon dioxide, from a mixture of acidic gases and hydrocarbons with an aqueous diethanolamine solution, said antifoam composition comprising a mixture of a light mineral oil and cottonseed oil.

The mineral oil incorporated in the antifoam composition according to our invention is preferably a light mineral oil having a viscosity of about 30 to about 50 SUS at 700°. Mineral oils which are made up predominantly of paraffinic constituents are preferred. However, aromatics and olefins can also be present. Thus, a light gas oil such as one obtained in a fluid catalytic cracking process and which consists essentially of paraffinic and aromatic constituents and a small amount of olefins is an example of a preferred mineral oil with which the cottonseed oil is admixed.

The cottonseed oil employed in the antifoam composition according to our invention can be either a crude grade thereof or a refined oil. Cottonseed oil typically has a specific gravity of about 0.920 to 0.930; a saponification value of about 190 to 200; an iodine value of about 100 to 120; and a titer of 32° to 36° C.

The proportions of the mineral oil and cottonseed oil in the antifoam composition of the invention may vary over relatively wide limits. The mineral oil, for example, can comprise about 20 to about 90 percent by weight of the antifoam composition and the cottonseed oil can comprise of 80 to about 10 percent by weight of the composition. A preferred composition in treating a tail gas obtained from a fluid catalytic cracking process comprises about 50 to about 75 percent by weight of a light mineral oil and about 25 to about 50 percent by weight cottonseed oil, an especially preferred composition comprising about 75 percent by weight of a fluid catalytically cracked gas oil and about 25 percent by weight of cottonseed oil. The amount of the antifoam composition employed in treating a sour hydrocarbon stream with an aqueous diethanolamine solution depends upon the amount of hydrocarbon stream treated and the quantity of diethanolamine solution charged. In most instances, however, the antifoam composition comprises about 0.001 to about 0.01 percent by weight based on the weight of the aqueous diethanolamine used, the preferred amount being ordinarily of the order of about 0.002 to about 0.005 percent. In any event, the amount used is sufficient to substantially reduce the normal foaming tendency of the diethanolamine solution.

The accompanying drawing is illustrative of a flow diagram of a continuous cyclic process for separating hydrogen sulfide and carbon dioxide from gaseous and liquid hydrocarbon mixtures with an aqueous diethanolamine solution containing an antifoam composition of the invention. In order to present the flow diagram in a simplified form, conventional equipment including flow regulating valves, heat exchangers, pumps and the like have been omitted.

Now referring to the drawing, a sour hydrocarbon stream is introduced by conduit 10 into the lower portion of contactor 12. Contactor 12 can be a spray, packed or bubble plate column. The sour hydrocarbon stream rises through contactor 12 countercurrently to a descending stream of lean diethanolamine solution and antifoam composition introduced by conduit 14 into the upper portion of contactor 12. The lean diethanolamine solution in conduit 14 consists of fresh diethanolamine solution introduced by conduit 16, recycle diethanolamine solution introduced by conduit 18, and antifoam composition introduced by conduit 20. Fresh diethanolamine solution introduced by conduit 16 and antifoam composition introduced by conduit 20 is employed to compensate for any loss which occurs in the process. A purified hydrocarbon stream substantially free of hydrogen sulfide and carbon dioxide flows from the top of contactor 12 through conduit 22 to a hydrocarbon separator 24. A purified hydrocarbon stream is removed from hydrocarbon separator 24 through conduit 26 for further processing or use. A rich diethanolamine solution which contains antifoam composition and which has absorbed hydrogen sulfide and carbon dioxide is removed from the base of contactor 12 through condiut 28. Any diethanolamine solution and antifoam composition which is carried out of the top of contactor 12 with the purified hydrocarbon stream in conduit 22 is separated and collected in hydrocarbon separator 24. The diethanolamine solution and antifoam composition so collected, is removed by conduit 30 and admixed with the rich diethanolamine solution in conduit 28. The rich diethanolamine solution in conduit 28 is then passed through a filter 32 and conduit 34 to a diethanolamine reactivator 36. In reactivator 36, rich diethanolamine solution flows downwardly over bubble trays in intimate contact with an upwardly flowing stream of vapors from reboiler 54. As the diethanolamine solution approaches its boiling point near the bottom of reactivator 36, hydrogen sulfide and carbon dioxide are liberated and carried upwardly with the vapors. Acid gas and vapors are removed from reactivator 36 through conduit 38 and an acid gas cooler 40 to a reflux accumulator 44 where condensate is separated from the gas. The condensate accumulating in accumulator 44 is returned by reflux pump 46 and conduit 48 to the top of reactivator 36. The acid gas is vented from the top of accumulator 44 through conduit 50 by a back pressure controller (not shown). The acid gas is then passed to a further recovery or disposal system (not shown). Stripped diethanolamine solution flows from the bottom of reactivator 36 through conduit 52 to reboiler 54 where the solution is boiled. The vapors from the boiling solution pass out of the top of reboiler 54 through conduit 56 into reactivator 36 and then rise through the reactivator. A lean recycle diethanolamine solution which also contains antifoam composition is removed from the reactivator 36 by conduit 18.

In one embodiment of the invention an absorber-stripper tail gas consisting essentially of hydrogen, nitrogen, $C_1$ to $C_3$ hydrocarbons, hydrogen sulfide, carbon dioxide and carbon monoxide is introduced into the bottom of packed contactor 12 by conduit 10 at a temperature of about 112° F. and a pressure of about 180 p.s.i.g. The gaseous mixture then rises through the packing (1¼″ Raschig rings) in contactor 12. The gaseous mixture is intimately contacted with a descending stream of aqueous diethanolamine (85 percent water and 15 percent diethanolamine) containing about 0.002 to about 0.005 percent by weight of an antifoam composition. The antifoam composition consists essentially of about 75 percent by weight light mineral oil having a viscosity of about 35 SUS at 100° F. and 25 percent of cottonseed oil having a specific gravity of 0.922, an iodine number of 102 and a saponification number of 195. A purified gaseous hydrocarbon stream consisting essentially of hydrogen, nitrogen, $C_1$ to $C_3$ hydrocarbons and carbon monoxide and containing some diethanolamine solution and antifoam composition is withdrawn from contactor 12 through conduit 22 to hydrocarbon separator 24. A purified gaseous hydrocarbon stream consisting essentially of hydrogen, nitrogen, $C_1$ to $C_3$ hydrocarbons and carbon monoxide is withdrawn from hydrocarbon separator 24 through conduit 26 for further processing or use. A rich diethanolamine solution which contains antifoam composition and absorbed acidic gases is withdrawn from contactor 12 through conduit 28. The rich diethanolamine solution is then passed through filter 32 and introduced into the upper portion of reactivator 36 at a temperature of about 212° F. and a pressure of about 15 p.s.i.g. In reactivator 36 the diethanolamine solution flows downwardly over bubble trays and is heated to its boiling point, approximately 250° F., as it reaches the bottom tray by vapors from reboiler 54. As the solution approaches this temperature, the hydrogen sulfide and carbon dioxide are liberated from the solution and removed from reactivator 36 along with vapors at a temperature of about 240° F. through conduit 38. Diethanolamine solution and antifoam composition, which is stripped of hydrogen sulfide and carbon dioxide, pass from reactivator 36 at about 259° F. and 20 p.s.i.g. through conduit 18 for cooling and subsequent recycling to contactor 12. Make-up for any diethanolamine solution and/or antifoam composition which is lost in the process is introduced into conduit 14 by conduits 16 and 20, respectively.

According to another embodiment of the invention, a sour liquid hydrocarbon stream consisting essentially of $C_2$ to $C_4$ hydrocarbons and hydrogen sulfide is introduced into the bottom of packed contactor 12 by conduit 10 at a temperature of about 100° F. and a pressure of about 400 p.s.i.g. The sour liquid hydrocarbon stream rises through the packing in the contactor countercurrently to a descending 20 percent aqueous diethanolamine solution containing about 0.002 to about 0.005 percent by weight of an antifoam composition consisting essentially of about 75 percent by weight of a light mineral oil having a viscosity of about 35 SUS at 100° F. and 25 percent by weight of cottonseed oil. Separation of the hydrocarbons and diethanolamine solution is effected by a differential in the specific gravities of the two liquids. A purified hydrocarbon stream substantially free of hydrogen sulfide (2 grains of hydrogen sulfide per gallon) flows from the top of contactor 12 through conduit 22 to hydrocarbon separator 24. From hydrocarbon separator 24, purified hydrocarbons pass through conduit 26 and a cooler (not shown). The cooled hydrocarbon stream is then ready for further processing or use. A rich diethanolamine solution containing absorbed hydrogen sulfide and antifoam composition is removed from contactor 12 through conduit 28 to a diethanolamine reactivation system as discussed above.

It will be understood that the temperatures and pressures employed in the above specific embodiments are illustrative only and that other conditions can be employed without departing from the scope of the invention. Likewise, the concentration of the diethanolamine solution can vary over wide limits. In general, the amount of water in the diethanolamine solution comprises about 70 to about 92 percent by weight of the total solution. The optimum amount of water for any given separation may vary, but this amount can readily be determined by routine experimentation. In treating an absorber-stripper tail gas at a temperature of 100° to 135° F. and a pressure of 150 to 180 p.s.i.g., the diethanolamine solution advantageously contains about 83 to about 88 percent by weight of water. Under the same conditions, an antifoam composition consisting of 75 percent by weight of light gas oil and 25 percent by weight of cottonseed oil is used in amounts of 15 to 25 parts per million parts of diethanolamine solution.

In order to compare the effectiveness of an antifoam composition of the invention in a hydrocarbon sweetening process of the type defined hereinabove, an absorber-stripper tail gas was contacted countercurrently in contactor 12 with a 15 percent aqueous diethanolamine solution at a temperature of 125° F. and a pressure of 180 p.s.i.g. The procedure was repeated using 0.001 to 0.003 p.s.i.g. The procedure was repeated using 0.001 to 0.003 percent, based on the diethanolamine solution, of (1) light gas oil; (2) cottonseed oil; and (3) mixtures of light gas oil and cottonseed oil. The results of these tests are set forth in the following table:

| Diethanolamine solution with— | Percent by weight | Remarks |
|---|---|---|
| No additive | | Foaming occurred. |
| Light gas oil | 0.001 to 0.003 | Do. |
| Cottonseed oil | 0.001 to 0.003 | Do. |
| 50% light gas oil, 50% cottonseed oil | 0.001 to 0.003 | No foaming occurred. |
| 75% light gas oil, 25% cottonseed oil | 0.001 to 0.003 | Do. |

In the light of the above data, it is indeed surprising to find that mixtures of light gas oil and cottonseed oil prevented foaming in the separation process whereas each of these oils alone did not prevent foaming. Typical tests on the light gas oil and cottonseed oil used in the above specific examples are as follows.

Light gas oil:
  Gravity, ° API _____ 26.8
  Specific gravity, 60°/60° F. _____ 0.8939
  Viscosity, SUV, sec. at 100° F. _____ 35.4
  Distillation, gas oil, ASTM D158–53—
    Overpoint, ° F. _____ 400
    Endpoint, ° F. _____ 650
  Hydrocarbon analysis, percent by vol., ASTM D1319–55T—
    Aromatics _____ 41
    Olefins _____ 7
    Saturates _____ 52
  Aniline point, ° F., Gulf 147 _____ 107.5
  Bromine number, ASTM D1158–55T _____ 18.4

Cottonseed oil:
  Gravity, ° API _____ 22.0
  Specific gravity, 60°/60° F. _____ 0.922
  Viscosity, SUV, sec.—
    100° F. _____ 174.9
    210° F. _____ 52.6
  Flash, OC, ° F. _____ 590
  Fire, OC, ° F. _____ 670
  Cloud, ° F. _____ +44
  Pour, ° F. _____ +30
  Titer test, AOCS, ° F. _____ 94.8
  Physical state, Gulf 557 _____ Liquid
  Color, ASTM union _____ 2.25
  Refractive index, $n_D^{20}$, Gulf 345 _____ 1.47137
  Sulfur, B, percent _____ 0.03
  Carbon residue, Conradson, percent _ 0.34
  Neutralization value, ASTM D974—
    Total acid number _____ 0.11
  Iodine number, mod. Hanus, Gulf 18 _ 102
  Saponification number, ASTM D94 ____ 195

While our invention has been described above with reference to various specific examples and embodiments, it will be understood that the invention is not limited to such illustrative examples and embodiments, and may be variously practiced within the scope of the claims hereinafter made.

We claim:
1. In a process for separating acidic gases from a mixture of acidic gases and hydrocarbons by contacting said mixture with an aqueous diethanolamine solution under contacting conditions normally tending to induce foaming, the improvement which comprises contacting said mixture of acidic gases and hydrocarbons with an aqueous diethanolamine solution containing a small amount, sufficient to inhibit the normal foaming tendency, of an antifoam composition comprising about 20 to about 90 percent by weight of a light mineral oil having a viscosity of about 30 to about 50 SSU at 100° F. and about 80 to about 10 percent by weight of cottonseed oil.

2. The process of claim 1 wherein the aqueous diethanolamine solution contains about 70 to about 92 percent by weight of water.

3. The process of claim 1 wherein the amount of the antifoam composition is about 0.001 to about 0.01 percent by weight based on the weight of the diethanolamine solution.

4. In a process for separating hydrogen sulfide and carbon dioxide from a mixture of hydrogen sulfide, carbon dioxide and gaseous hydrocarbons by contacting said mixture with an aqueous diethanolamine solution under contacting conditions normally tending to induce foaming, the improvement which comprises contacting said mixture of hydrogen sulfide, carbon dioxide and gaseous hydrocarbons with an aqueous diethanolamine solution containing a small amount, sufficient to inhibit the normal foaming tendency, of an antifoam composition comprising about 20 to about 90 percent by weight of a light mineral oil having a viscosity of about 30 to about 50 SUS at 100° F. and about 80 to about 10 percent by weight of cottonseed oil.

5. The process of claim 4 wherein the aqueous diethanolamine solution contains about 70 to about 92 percent by weight of water.

6. The process of claim 4 wherein the amount of the antifoam composition is about 0.001 to about 0.01 percent by weight based on the weight of the diethanolamine solution.

7. In a process for separating hydrogen sulfide and carbon dioxide from a mixture of hydrogen sulfide, carbon dioxide and gaseous hydrocarbons by contacting said mixture with an aqueous diethanolamine solution under contacting conditions normally tending to induce foaming, the improvement which comprises contacting said mixture of hydrogen sulfide, carbon dioxide and gaseous hydrocarbons with an aqueous diethanolamine solution containing about 0.002 to about 0.005 percent by weight based on the weight of the diethanolamine solution of an antifoam composition comprising about 50 to about 75 percent by weight of a light mineral oil having a viscosity of about 30 to about 50 SUS at 100° F. and about 25 to about 50 percent by weight of cottonseed oil.

8. In a process for separating hydrogen sulfide and carbon dioxide from a mixture of hydrogen sulfide, carbon dioxide and gaseous hydrocarbons by contacting said mixture with an aqueous diethanolamine solution under contacting conditions normally tending to induce foaming, the improvement which comprises contacting said mixture of hydrogen sulfide, carbon dioxide and gaseous hydrocarbons with a 70 to 92 percent aqueous diethanolamine solution containing about 0.002 to about 0.005 percent by weight based on the weight of the diethanolamine solution of an antifoam composition consisting essentially of about 75 percent by weight of a light mineral oil having a viscosity of about 35 SUS at 100° F. and about 25 percent by weight of cottonseed oil.

References Cited in the file of this patent

UNITED STATES PATENTS

| 1,944,122 | Fife | Jan. 16, 1934 |
| 2,373,951 | Evans et al. | Apr. 17, 1945 |
| 2,413,353 | Hunter et al. | Dec. 31, 1946 |
| 2,762,780 | Kulakow | Sept. 11, 1956 |

UNITED STATES PATENT OFFICE
CERTIFICATE OF CORRECTION

Patent No. 3,100,680                      August 13, 1963

John R. Shaw et al.

It is hereby certified that error appears in the above numbered patent requiring correction and that the said Letters Patent should read as corrected below.

Column 1, line 47, for "contractors" read -- contactors --; column 2, line 3, for "upon" read -- under --; line 19, for "700°" read -- 100° F. --; column 6, line 7, for "SSU" read -- SUS --.

Signed and sealed this 4th day of February 1964.

(SEAL)
Attest:
ERNEST W. SWIDER

Attesting Officer

EDWIN L. REYNOLDS

Acting Commissioner of Patents